United States Patent [19]

Berry et al.

[11] Patent Number: 5,881,222
[45] Date of Patent: Mar. 9, 1999

[54] METHOD AND APPARATUS FOR DETECTING PERFORMANCE PROBLEMS IN A WINDOWS-BASED COMPUTER SYSTEM

[75] Inventors: Robert Francis Berry, Austin, Tex.; Joseph Hellerstein, Ossining, N.Y.

[73] Assignee: International Business Machines Corporation, Armonk, N.Y.

[21] Appl. No.: 376,714

[22] Filed: Jan. 23, 1995

[51] Int. Cl.⁶ .................................................. G06F 11/00
[52] U.S. Cl. .................................. 395/184.01; 345/995
[58] Field of Search ....................... 395/184.01; 345/326, 345/340, 348, 995

[56] References Cited

U.S. PATENT DOCUMENTS

| | | | |
|---|---|---|---|
| 4,601,008 | 7/1986 | Kato | 364/900 |
| 4,745,549 | 5/1988 | Hashimoto | 364/402 |
| 4,994,926 | 2/1991 | Gordon et al. | 358/400 |
| 4,996,643 | 2/1991 | Sakamoto et al. | 364/424.03 |
| 5,086,393 | 2/1992 | Kerr et al. | 364/419 |
| 5,101,425 | 3/1992 | Darland et al. | 379/34 |
| 5,103,394 | 4/1992 | Blasciak | 395/575 |
| 5,109,350 | 4/1992 | Henwood et al. | 364/550 |
| 5,134,574 | 7/1992 | Beaverstock et al. | 364/551.01 |
| 5,220,658 | 6/1993 | Kerr et al. | 395/500 |
| 5,351,201 | 9/1994 | Harshbarger | 364/551.01 |

*Primary Examiner*—Hoa T. Nguyen
*Attorney, Agent, or Firm*—Sawyer & Associates; Mark S. Walker

[57] ABSTRACT

A method and apparatus is provided that measures end-user perceived performance in a computer having a windowed graphic display. The method and apparatus provides for a performance survey application which allows for detecting whether performance of the computer system has degraded. An indication is provided on the display. Also provided on the display is a button that when clicked by the user generates a record indicating that performance is poor. The status of the system is updated in response to user clicks. This in turn causes appropriate updates in the display. Finally, the record associated with the user's click is written to the appropriate memory location. In so doing, a system is provided that allows for continuous indication of the performance of the computer system.

9 Claims, 4 Drawing Sheets

METHOD AND APPARATUS FOR DETECTING PERFORMANCE PROBLEMS IN A WINDOWS-BASED COMPUTER SYSTEM

FIELD OF THE INVENTION

The present invention relates to a computer system and more particularly to a method and apparatus for detecting performance problems in a computer system.

BACKGROUND OF THE INVENTION

Computer systems sometimes fail to deliver the expected level of performance. There are many reasons for the performance level not being at the expected level. Some reasons for the performance problems are changes in workload, the occurrence of hardware or software errors, under-configuration (e.g., too little memory), configuration errors, lack of tuning, and over-commitment of resources. Addressing these problems requires first that they be detected (or anticipated, if possible); then that the reasons for their occurrence be identified; next, steps are taken to remedy the situation; and finally, the fix must be verified.

Detection of performance problems is difficult. The relevant data is not centrally available in many computer systems such as UNIX systems or the like. Further, the interpretation of that data often requires expertise not commonly associated with system administration. However, identifying performance problems is important, for their presence diminishes a customer's investment in a computer system by robbing the customer of purchased resources.

A key concern in managing a computer installation is developing metrics that adequately quantify performance. For mainframe systems, internal measures of performance are commonly used (e.g., response time for CPU transactions). Unfortunately, such metrics often bear only an indirect relationship to performance as it is perceived by end-users, and hence these metrics are often ineffective at detecting performance problems.

Detecting performance problems is even more difficult for window-based workstations (e.g., workstations running X-Windows, Microsoft Windows, or the OS/2 Presentation Manager) in that having a long response time for an action initiated in one window does not mean that the end-user is delayed since the user can still have useful interactions in other windows. Accordingly, what is needed is a system for measuring performance in a window based environment. The system should be one in which the user can quickly and easily indicate that a problem is occurring in the computer. The present invention addresses such a need.

SUMMARY OF THE INVENTION

A performance survey method and system in a computer system having a windowed graphic display is disclosed. The invention employs displaying an actionable window for indicating the performance of the computer. A method and apparatus in accordance with the present invention also includes receiving a user input action related to the actionable window and then providing an indicator on the display acknowledging that the end-user perception of performance has changed. Through the method and system of the present invention, a system administrator, who is not co-located with the end-user, can continuously monitor the end-user perception of performance. Accordingly, an administrator can more easily detect and diagnose a performance problem within the computer. In addition, through this system a user can determine how a particular application program's performance is being affected by the underlying performance of the computer system and its components.

DESCRIPTION OF THE INVENTION

The present invention relates to an improvement in the detection and diagnosis of performance problems in a computer system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
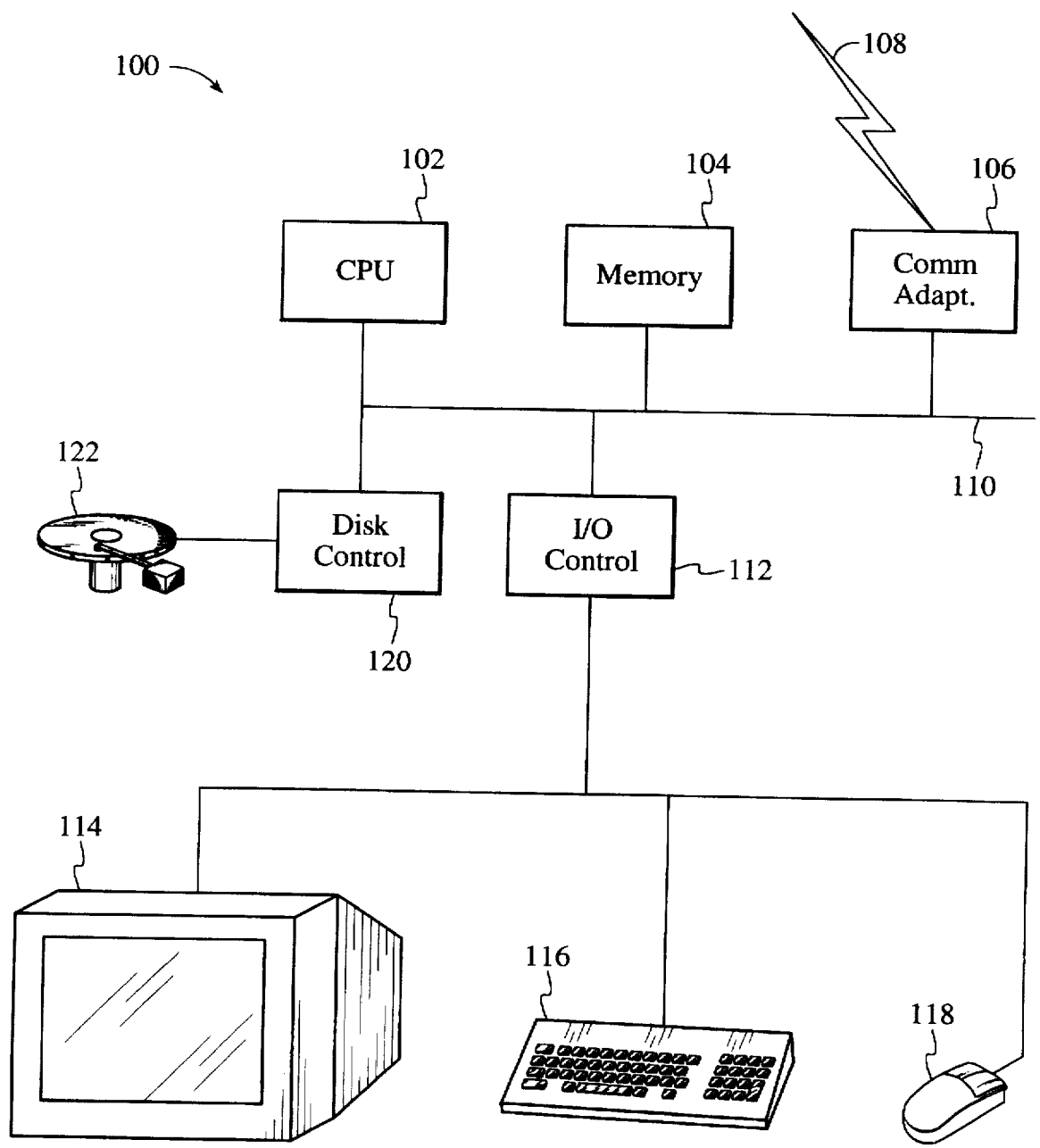
FIG. 1 is a schematic diagram of a computer system for use with the present invention.

More particularly, the present invention directs the operation of a computer system having the components shown generally in FIG. 1. Processing is provided by a central processing unit (CPU) 102. CPU 102 acts on instructions and data stored in random access memory 104. One or more disks 122, controlled by a disk controller 120, provide long term storage. A variety of other storage media could be employed, including tape, CD-ROM, or WORM drives. Removable storage media may also be provided to store data or computer process instructions.

Users communicate with the system through I/O devices which are controlled by I/O controller 112. Display 114 presents data to the user, while keyboard 116 and pointing device 118 allow the user to direct the computer systems. Communications adapter 106 controls communications between this processing unit and other processing units connected to a network by network interface 108.

Accordingly a system is provided that secures the involvement of a user in a relatively unobtrusive manner. This mechanism requires having an additional program running, which is referred to as the performance survey application. Whenever the end-user feels that performance is inadequate, he/she clicks on an area displayed by the performance survey application. The action causes the application to generate a measurement event that includes at least two pieces of information: the time of the user's click and the identification of the survey application window. (The latter is required to provide real-time diagnosis and to permit having multiple performance survey applications running on a workstation, each associated with a different end-user application.) In addition, the performance survey application records the times during which survey events are logged, which is necessary to convert complaint events into complaint rates.

The information collected by the performance survey application can be used in several ways. First, it provides a direct measure of end-user dissatisfaction with system performance, and hence provides an effective means for detecting performance problems. Second, the times at which performance complaints occur can be correlated with system resource activity (e.g., workstation, LAN and server activity) so as to pinpoint the underlying cause. In addition, if the performance survey application is run on multiple workstations in a network, the times at which users complain can be compared so as to identify problems that are common to multiple users.

Figure 2:
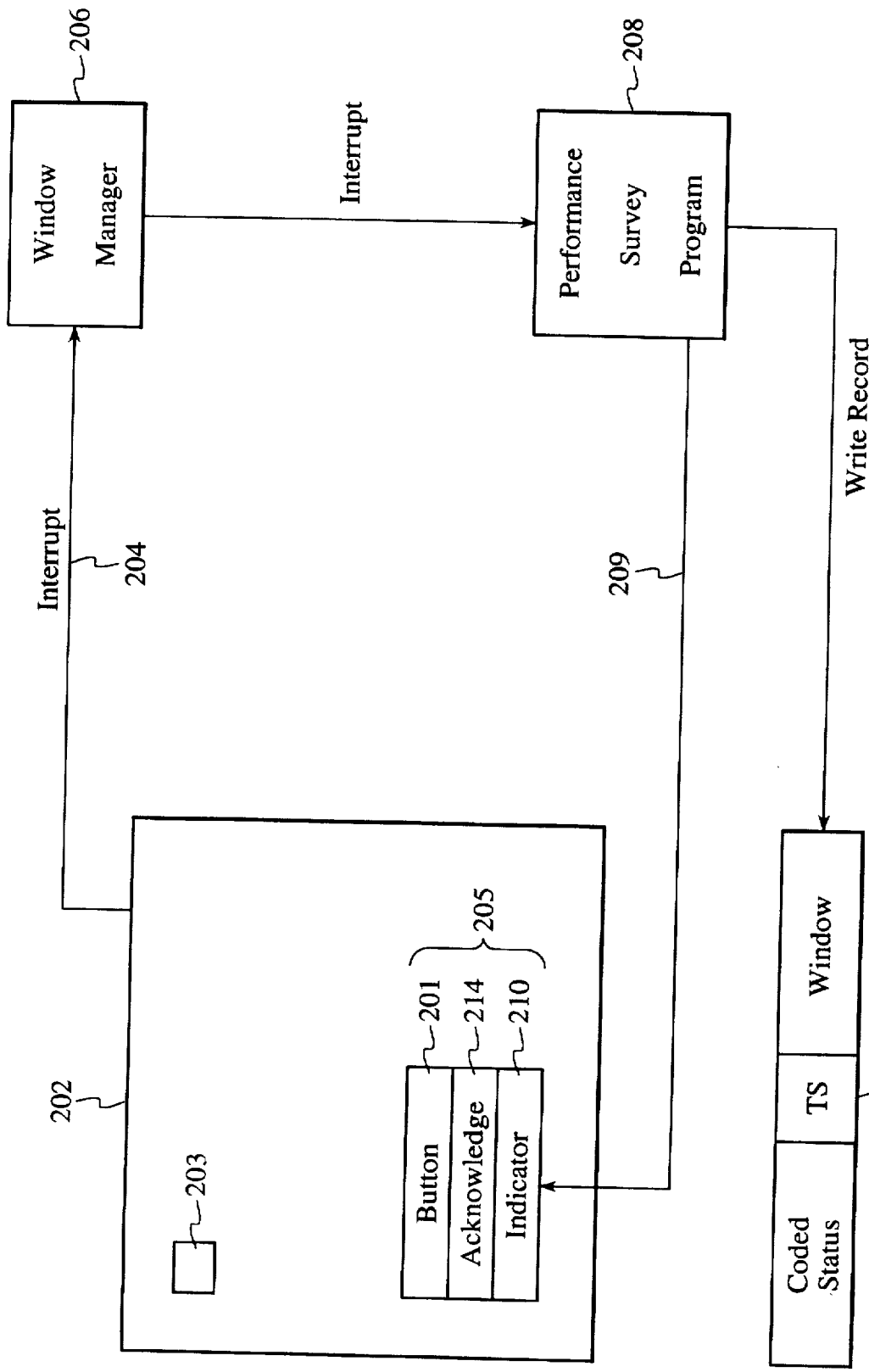
FIG. 2 is a block diagram of a first embodiment of a system in accordance with the present invention.

FIG. 2 shows a simplified diagram of one embodiment of a performance survey system 200. Depicted in block 202 is the user desktop (that is, what an end-user might see on the display device); the desktop contains two entities (in general, many more are present), the user's application program 203 (e.g., a spreadsheet, a wordprocessor) and a performance survey icon 205. The icon 205 consists of three fields: a survey button 201 used for input (i.e., action with a mouse), an indicator part 210 used for output and an acknowledgement part 214 also used for output.

In this embodiment, a user's click of the mouse on the survey icon button 201 results in a signal to a window manager 206 via line 204. (This is typical behavior for window-based environments; users interact with screen objects through mouse actions, and these interactions result in signals to the window manager. The window manager is responsible for routing those signals to the appropriate programs.) The window manager 206 directs the signal -to the performance survey program 208. In general, it would be this program that caused the survey icon to be displayed; the window manager 206 ensures that user interactions on this icon are directed in the form of signals/interrupts back to the survey program 208. The survey program 208 now updates the acknowledgement 214 and indicator 210 fields in the icon 205 via line 209. The indicator 210 is updated to reflect the revised end-user perception of performance. It is assumed that users employ the performance survey system at times of poor performance; therefore, the indicator 210 will be updated to reflect the perception that performance has worsened. There are many ways that the indicator 210 could indicate poorer performance; for example, the indicator 210 could change from green to red, or it could become darker, or there could be some change in shape (e.g., from a 'happy face' to a 'frowning face').

The acknowledgement field 214 is updated to acknowledge that the user's complaint has been registered. This field 214 provides a textual means to reflect receipt of the complaint; it also affords an opportunity for feedback in the form of a preliminary diagnosis (providing the analysis is available to perform such a diagnosis).

Also shown in FIG. 2, the performance survey program 208 produces a logged record of user complaints by producing a trace record 212. The trace record 212 consists of several fields; a coded status reflecting the numeric encoding of the status information that is simultaneously reflected in the updated indicator display 210, a timestamp, and a window handle for the performance survey icon 205. The trace record record 212 is delivered in some manner appropriate to the computer's operating system (e.g., a trace file, an internal system trace buffer, via an event notification mechanism). In general, the event is logged to some storage medium where it can be utilized for other purposes.

For example, the status can be written out to a file that is subsequently accessed to provide input to a performance analysis. In another example, the information may be written out through a synchronous event mechanism in which another application (e.g., a performance management agent) could be informed of the event's occurrence thus causing some further action to occur. This further action could be a realtime performance diagnostic routine, possibly returning its assessment to the end-user via the survey icon acknowledgement field 214.

Accordingly, performance complaints can be registered by clicking on the button. The indicator area 210 provides an immediate response when the survey button is clicked (e.g., "problem recorded at 9:30 am on Jan. 31, 1993"); this facility is provided to avoid having users be frustrated about the lack of immediate feedback. The acknowledgement area 214 is used as an extension to the indicator area. For example, when the click rate exceeds a threshold, an analysis program could be initiated that would provide a preliminary diagnosis (e.g., "you are experiencing poor performance because the network is congested"). Implementation only requires a straight-forward application of existing software technology.

Figure 3:
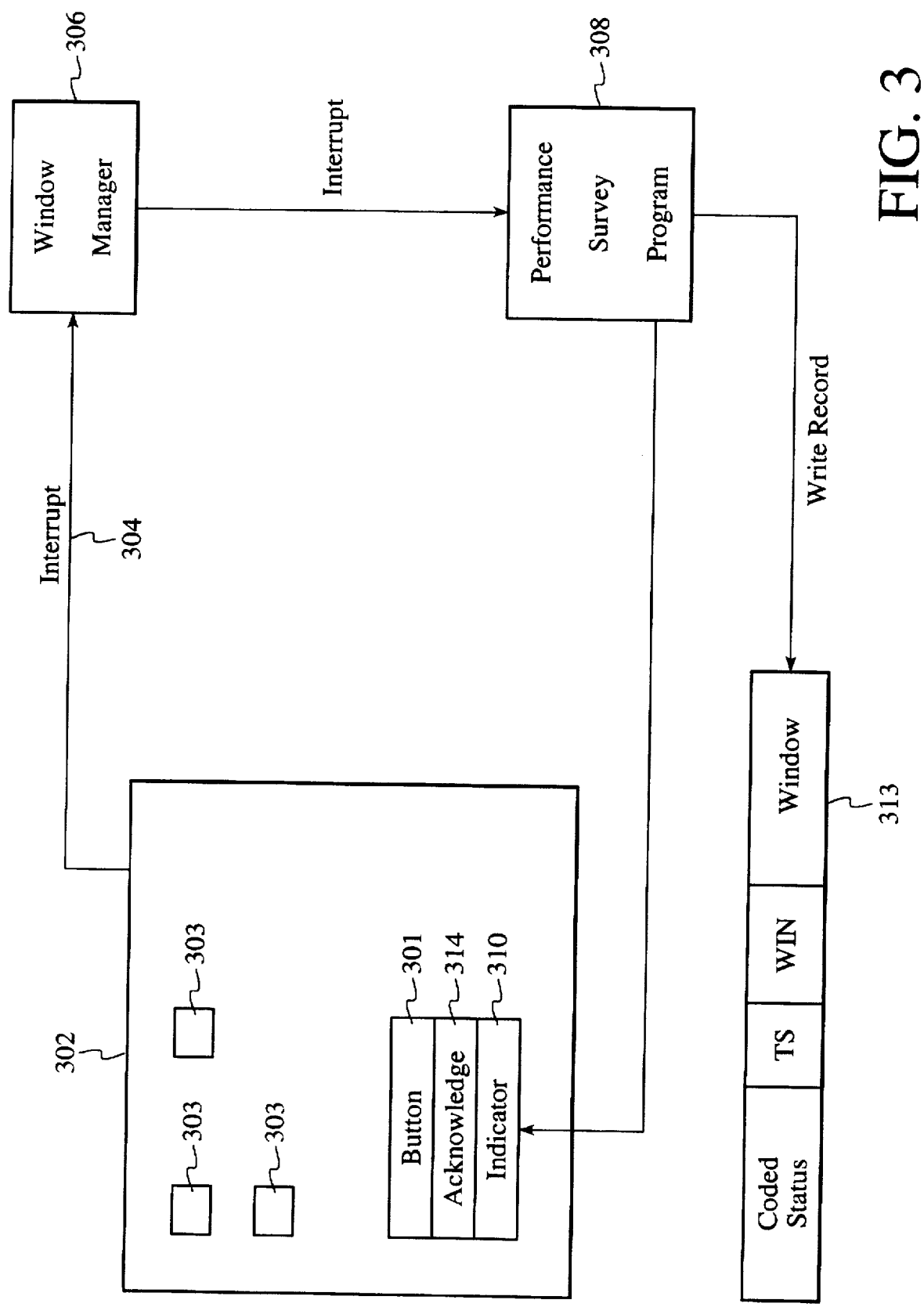
FIG. 3 is a block diagram of a second embodiment of a system in accordance with the present invention.

Referring now to FIG. 3, what is shown is a performance survey system 300 similar to the system shown in FIG. 2 except that there are multiple, in this case three, application programs running as indicated by blocks 303. The system operates similarly to that shown in FIG. 2, except that in addition to the time stamp and window information, a window handle 313 is utilized to monitor which program is causing the performance problems. Hence, for example, each application program (blocks 303) provides its own status indication. Hence, the manner in which overall performance of the computer system is affecting each of the application programs can be determined either individually or cumulatively.

Figure 4:
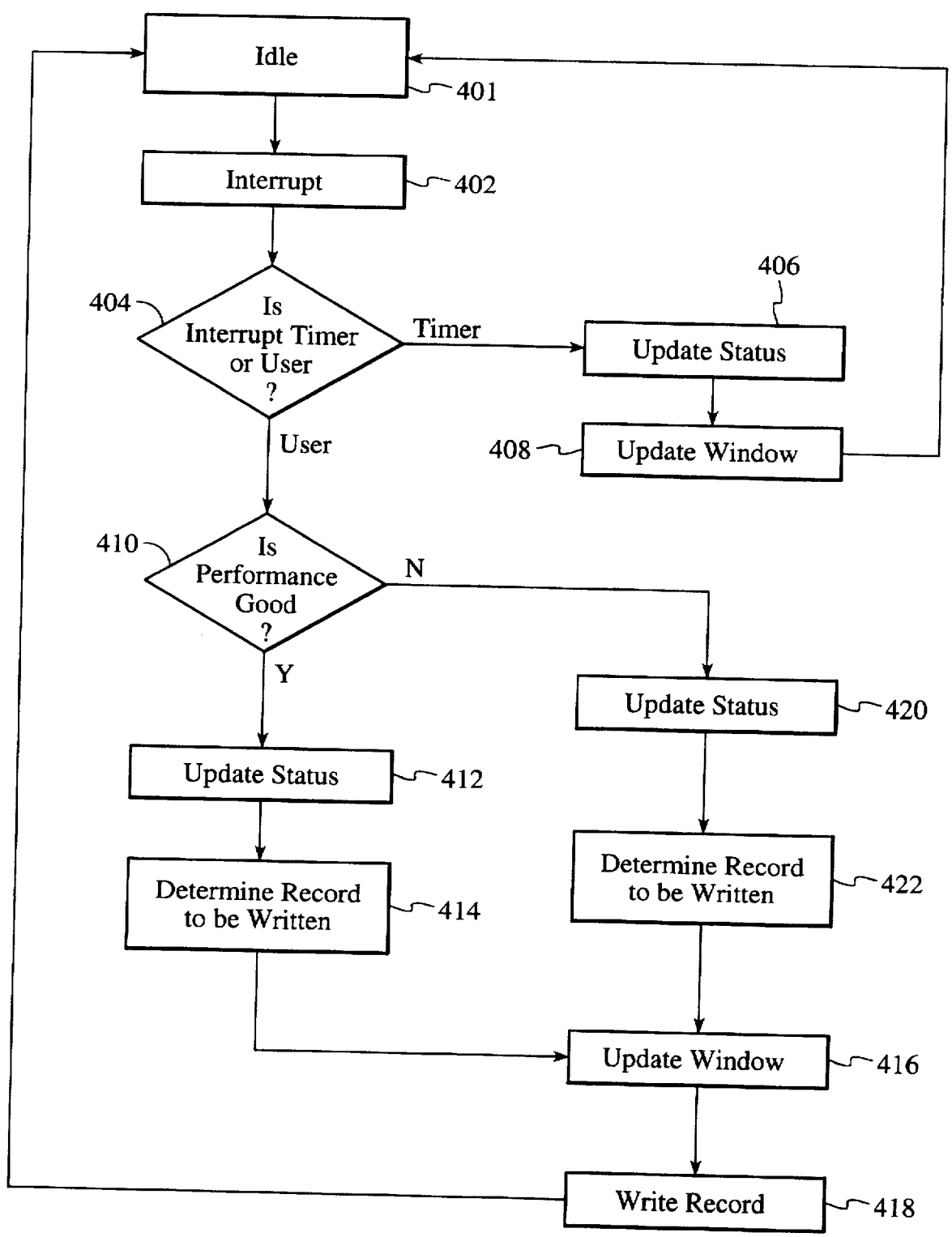
FIG. 4 is a flow chart of the operation of the system in accordance with the present invention.

To more particularly describe the operation of a performance survey system in accordance with the present invention refer now to FIG. 4, which is a flow chart of the operation of the system. In this embodiment, an interrupt is received via step 402. The first item that is determined is whether the interrupt is a timer interrupt or a user interrupt via step 404. If the interrupt is a timer interrupt then the status record is updated via step 406 and then the performance survey icon window is updated via step 408. This update reflects an ageing of the status back to the neutral state via step 408. As a practical consideration, the timer interrupts should not be so frequent as to adversely affect performance diagnosis.

If, on the other hand the interrupt is a user interrupt then a determination is made whether the perceived performance of the computer system is good, via step 410. If the performance is good, then the status is updated positively via step 412. The appropriate record is then determined via step 414. Thereafter, the window is updated via step 416. Thereafter, the appropriate record is written via step 418.

Typically, the user will only access the performance survey system if the performance has been affected negatively. Hence, when the perceived performance has worsened via step 410, then the status is updated negatively via step 420. The appropriate record is determined via step 422. Thereafter, the window is updated via step 416. The appropriate record is then written via step 418 and then return to the idle mode step 401.

Accordingly, a performance survey system in accordance with the present invention will allow an enterprise to quantify better when performance is inadequate so that actions can be taken to correct problems before end-user productivity suffers. In addition, the performance survey system in accordance with the present invention provides a truly external measure of the end-user perception of performance, the present invention also aids in diagnosing computer performance problems. Finally, although the present invention has been disclosed in the context of a particular environment, the system has application to any window-based computer system.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method of measuring performance in a computer system having a windowed graphic display, the method comprising:

(a) providing status information regarding the performance of the computer system;

(b) displaying an actionable window having an indicator for indicating the performance of the computer system;

(c) receiving a user interrupt in response to said actionable window;

(d) providing an interrupt to the computer system;

(e) determining if the interrupt is one of a timer interrupt and the user interrupt;

(f) if the interrupt is a timer interrupt, updating the status information and updating the actionable window on the display by sequentially aging the indicator to a neutral state, and (g) if the interrupt is a user interrupt, determining whether the performance of the computer system is good;

(h) if the performance is good, updating the status information positively;

(i) if the performance is not good, updating the status information negatively;

(j) updating the actionable window on the display with the status information; and (k) writing a record of the status information into a storage location.

2. A system for surveying the performance of a computer system having a display, the system comprising:

at least one program visible on the display;

means for providing a performance survey window on the display, the performance survey window including an input field, an indicator field, and an acknowledgement field, the input field for detecting a user interrupt;

means responsive to the user interrupt for updating the acknowledgement field to acknowledge that the user interrupt has been registered, and for updating the indicator field to reflect the performance of the system; and means responsive to the user interrupt for producing a record for recording the performance of the system and an identification of the performance survey window.

3. A system as in claim 2 further including:

means for receiving a timer interrupt; and means responsive to the timer interrupt for updating the indicator field to a neutral state.

4. A performance survey program for use in a computer system having a display and at least one program visible on the display, the performance survey program comprising:

means for providing a performance survey window on the display, the performance survey window including an input field, an indicator field, and an acknowledgement field, the input field for detecting a user interrupt;

means responsive to the user interrupt for updating the acknowledgement field to acknowledge that the user interrupt has been registered, and for updating the indicator field to reflect the performance of the system; and means responsive to the user interrupt for producing a record for recording the performance of the system and an identification of the performance survey window.

5. A program as in claim 4 further including:

means for receiving a timer interrupt; and means responsive to the timer interrupt for updating the indicator field to a neutral state.

6. A method of surveying the performance of a computer system having a display and at least one program visible on the display, the method comprising the steps of:

(a) providing a performance survey window on the display, the performance survey window including an input field, an indicator field, and an acknowledgement field, the input field for detecting a user interrupt;

(b) updating the acknowledgement field in response to the user interrupt to acknowledge that the user interrupt has been registered;

(c) updating the indicator field to reflect the performance of the system; and (d) recording the performance of the system in a record including an identification of the performance survey window.

7. A method as in claim 6 further including the steps of:

(e) receiving a timer interrupt; and (f) updating the indicator field to a neutral state in response to the timer interrupt.

8. A computer-readable medium containing program instructions for surveying the performance of a computer system having a display and at least one program visible on the display, the program instructions for:

(a) providing a performance survey window on the display, the performance survey window including an input field, an indicator field, and an acknowledgement field, the input field for detecting a user interrupt;

(b) updating the acknowledgement field in response to the user interrupt to acknowledge that the user interrupt has been registered;

(c) updating the indicator field to reflect the performance of the system; and (d) recording the performance of the system in a record including an identification of the performance survey window.

9. A computer-readable medium as in claim 8 further including the instructions of:

(e) receiving a timer interrupt; and (f) updating the indicator field to a neutral state in response to the timer interrupt.

* * * * *